United States Patent
Clark et al.

(10) Patent No.: US 11,463,341 B2
(45) Date of Patent: *Oct. 4, 2022

(54) NETWORK HEALTH MONITORING

(71) Applicant: HEWLETT PACKARD ENTERPRISE DEVELOPMENT LP, Houston, TX (US)

(72) Inventors: Charles F. Clark, Roseville, CA (US); Shaun Wackerly, Lincon, KY (US)

(73) Assignee: Hewlett Packard Enterprise Development LP, Houston, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 17/142,389

(22) Filed: Jan. 6, 2021

(65) Prior Publication Data

US 2021/0126852 A1     Apr. 29, 2021

Related U.S. Application Data

(63) Continuation of application No. 15/964,905, filed on Apr. 27, 2018, now Pat. No. 10,892,793.

(51) Int. Cl.
*H04L 43/50* (2022.01)
*H04L 41/0873* (2022.01)
*H04L 43/0817* (2022.01)

(52) U.S. Cl.
CPC .......... *H04L 43/50* (2013.01); *H04L 41/0873* (2013.01); *H04L 43/0817* (2013.01)

(58) Field of Classification Search
CPC .. H04L 43/50; H04L 43/0817; H04L 41/0873
USPC ........................................................ 709/224
See application file for complete search history.

(56) References Cited

U.S. PATENT DOCUMENTS

| | | | |
|---|---|---|---|
| 7,490,319 B2 | 2/2009 | Blackwell et al. | |
| 9,009,542 B1 | 4/2015 | Marr et al. | |
| 9,092,224 B2 | 7/2015 | Bartlow et al. | |
| 9,134,961 B1 * | 9/2015 | Cohen | G06F 8/30 |

(Continued)

FOREIGN PATENT DOCUMENTS

CN           102081622 A      6/2011

OTHER PUBLICATIONS

Faria, P., Test Automation in Continuous Integration for Hardware Validation, (Research Paper), Feb. 19, 2017, 59 Pgs.

*Primary Examiner* — Tauqir Hussain
(74) *Attorney, Agent, or Firm* — Mauriel Kapouytian Woods LLP (57) ABSTRACT

An example method is described for monitoring a network. The method includes detecting that a network attribute has been updated at a network device. The method further includes selecting, based in part on the updated network attribute, a set of network functionality tests from a group of network functionality tests. The method further includes executing the set of network functionality tests. The method further includes receiving information describing functionality of the network during the set of network functionality tests at the network device. The method further includes determining results of the set of network functionality tests based on the information describing functionality of the network. The method further includes calculating a network functionality score based, in part, on the results of the set of network functionality tests.

21 Claims, 4 Drawing Sheets

(56) References Cited

U.S. PATENT DOCUMENTS

| | | |
|---|---|---|
| 9,537,729 B2 | 1/2017 | Fidler |
| 9,565,059 B1 | 2/2017 | Manmohan et al. |
| 9,619,219 B1 | 4/2017 | Alford et al. |
| 9,760,366 B2 | 9/2017 | Frank et al. |
| 10,027,535 B1 | 7/2018 | Watsen |
| 10,489,180 B2 | 11/2019 | Sharma et al. |
| 10,721,124 B2 | 7/2020 | Patil et al. |
| 10,749,759 B2 | 8/2020 | Clark et al. |
| 10,892,973 B2 * | 1/2021 | Clark ................ H04L 43/50 |
| 2006/0140125 A1 * | 6/2006 | Ottinger ............ H04L 41/145 |
| | | 370/310 |
| 2008/0910554 | 1/2008 | Gonguet et al. |
| 2008/0271022 A1 | 10/2008 | Strassner et al. |
| 2013/0152047 A1 | 6/2013 | Moorthi et al. |
| 2013/0290512 A1 * | 10/2013 | Ngoo ............. H04L 41/0645 |
| | | 709/224 |
| 2014/0047112 A1 * | 2/2014 | Komiya ............ H04L 41/064 |
| | | 709/224 |
| 2015/0074259 A1 | 3/2015 | Ansari et al. |
| 2015/0304274 A1 | 10/2015 | Zhang |
| 2016/0330082 A1 | 11/2016 | Bliss et al. |
| 2017/0228312 A1 | 8/2017 | Shani et al. |
| 2017/0344703 A1 | 11/2017 | Ansari et al. |
| 2018/0007581 A1 * | 1/2018 | Cariou ............... H04B 7/0452 |
| 2018/0152347 A1 | 5/2018 | Dhandu et al. |
| 2019/0312775 A1 * | 10/2019 | Patil ................ H04L 41/085 |

* cited by examiner

NETWORK HEALTH MONITORING

BACKGROUND

When changes to configurations or statuses of network components are implemented, a network administrator checks the operation of the network to determine whether network operation is as expected given the change in configuration or status. The network administrator may check for multiple types of defects, including semantic defects, intra-device defects, and inter-device defects. Some defects, when introduced to a network, cause the network to operate in a non-optimal capacity. Other defects, when introduced to the network, cause the network, or a service of the network, to cease functioning, in part or in whole. The network administrator may execute a tool to detect semantic defects in a device configuration file or set up a test network or network simulation to test a change in network configuration.

BRIEF DESCRIPTION OF THE DRAWINGS

For a more complete understanding of the present disclosure, examples in accordance with the various features described herein may be more readily understood with reference to the following detailed description taken in conjunction with the accompanying drawings, where like reference numerals designate like structural elements, and in which.

Certain examples have features that are in addition to or in lieu of the features illustrated in the above-referenced figures. Certain labels may be omitted from certain figures for the sake of clarity.

DETAILED DESCRIPTION

In some traditional network environments, configuration and status changes to a network device or to the network topology may necessitate substantial manual testing by a network administrator. Although certain defects can be detected through semantic error checking tools, automated testing of a separately assembled test network, or testing of a simulation based on configuration attributes to be applied to the network, many defects may be missed due to the limitations of these test strategies. Commonly, the network administrator may supplement these test strategies with manual testing of the network.

In an example of this disclosure, an automated test suite is composed from a collection of network tests. Portions of the automated test suite are triggered to be executed against a proposed configuration update to a network device. Other portions of the automated test suite are triggered to be executed when a configuration change or status change of a network device is detected. Yet other portions of the automated test suite are triggered to be executed periodically. Certain tests of the automated test suite may be included in more than one portion, thus being triggered for execution by one of multiple triggers.

In some examples, tests of the automated test suite are selected and executed on each capable network infrastructure device (e.g. switches, routers). In some other examples, a device on the network (e.g. a server) provides the automated test suite to the network as a service. In this disclosure, any reference to functionality carried out on a "network device" contemplates the functionality happening on network infrastructure devices, devices on the network, or any other appropriate hardware, software, or combination thereof. Results of the tests of the automated test suite are collected. The results may include information that shows a defect in the operation of the network. Certain defects are non-optimal or inefficient operation of the network. For example, too much data traffic is passing through a certain network path while an alternative path is being underused. Certain other defects are inoperabilities of the network. For example, devices on a certain Virtual Local Area Network (VLAN) cannot communicate with the Domain Name System (DNS) server. Three classifications of defects include syntactic, intra-device, and inter-device. Syntactic defects may include typographical errors or improper formatting of a configuration file. Intra-switch defects may include defects that are caused by a configuration of a certain network device being incompatible with a feature of the same network device. Inter-device defects may include defects that are caused by a configuration of a certain network device being incompatible with a feature of another network device. Certain defects may be dynamic, wherein the defect is difficult or impossible to detect without certain contextual attributes. For example, a defect may only be detectable when traffic through a certain network link is above a certain threshold.

Upon detection of a change in a configuration of a network device, the automated test suite is executed, and the results of the automated test suite are used to determine a configuration score for the network device. The configuration score represents the stability and functionality of the network device. In some examples, the configuration score is hierarchical, in reflection of a hierarchically structured switch configuration. For example, if an administrator configures a complex feature (e.g. Border Gateway Protocol (BGP)), multiple configuration attributes within a certain switch's configuration may be altered, but other configuration attributes may not be affected. In such an example, the automated test suite would be composed from tests associated with the altered configuration attributes, as well as configuration attributes related (e.g. parents, children) to the altered configuration attributes. In some such examples, additional "sanity" tests may be included in the automated test suite in an attempt to detect unexpected alterations to the functionality of seemingly unrelated network functions.

When certain configuration changes are made, the related network function may not be enabled absent an explicit enablement within the configuration of the appropriate network devices. These latent configuration changes may still trigger an automated test suite to be executed based on the configuration attributes that have been altered. In some examples, such a test suite execution may discover certain types of defects caused by the configuration changes that affect existing functionality or will affect new functionality once enabled. For example, a configuration change in preparation for a not-yet-enabled network feature that improves routing of streaming video data may result in a mismatch of packet parameters between two routers, which indicates an inter-device defect. In some other examples, the configuration changes are prospective and have not yet been applied to the network. In such examples, the automated test suite may determine the prospective impact to network functionality based on the prospective configuration changes. For example, a configuration change in anticipation of improving video streaming data routing may alter a configuration attribute that would potentially disrupt the proper functioning of BGP.

Certain defects do not present measurable network symptoms until their related network functionality is enabled. For example, if the aforementioned feature improving routing of streaming video data is misconfigured, a resultant defect may route the streaming video data incorrectly, resulting in decreased video streaming performance. Although the latent defect is contained within configuration attributes prior to enabling the feature, it may not be practicable to detect the defect while still latent. In such examples, an automated test suite may be executed based on the enablement of the network feature. The automated test suite may include tests of the functionality of the network feature, which detect the decreased video streaming performance.

Yet other certain defects do not present measurable network symptoms until certain network conditions exist. For example, if the aforementioned feature improving routing of streaming video data is misconfigured, a resultant defect routing the streaming video data incorrectly may not result in decreased video streaming performance until a certain switch of the network is above 75% utilization. Although the latent defect is contained within configuration attributes prior to enabling the feature, it may not be practicable to detect the defect while still latent. Further, although the defect exists when the feature is enabled, it may not be practicable to detect the defect while the certain network conditions do not yet exist. In such examples, an automated test suite may be executed on a continuing basis. Such continuous background testing may execute on a regular basis, or may execute whenever certain network conditions exist (e.g. when business interruption would be minimized).

Results of the automated test suite may be compiled into a network health score. In some examples, each test of the automated test suite is assigned to one or more network features and returns a score (e.g. −1.00 to +1.00) and a confidence (e.g. 0.00 to 100.00). Further, each feature (and, thus, the tests assigned to the feature) is assigned a severity (e.g. 0 to 10). Using the scores for each test, the confidences for each test, and the severity for each feature, a network health score can be calculated. In some examples, the health score of the overall network is compiled from health scores of each feature of the network. For example, Feature A may have a score of −0.3 and Feature B may have a score of +0.93. The resultant network health score, taking into account the feature scores and the feature severities, may be +0.4. The network health score information (including feature health scores and test scores) may be provided to the network administrator through a web page, an email alert when a threshold is crossed, or any other appropriate means of notification.

Figure 1:
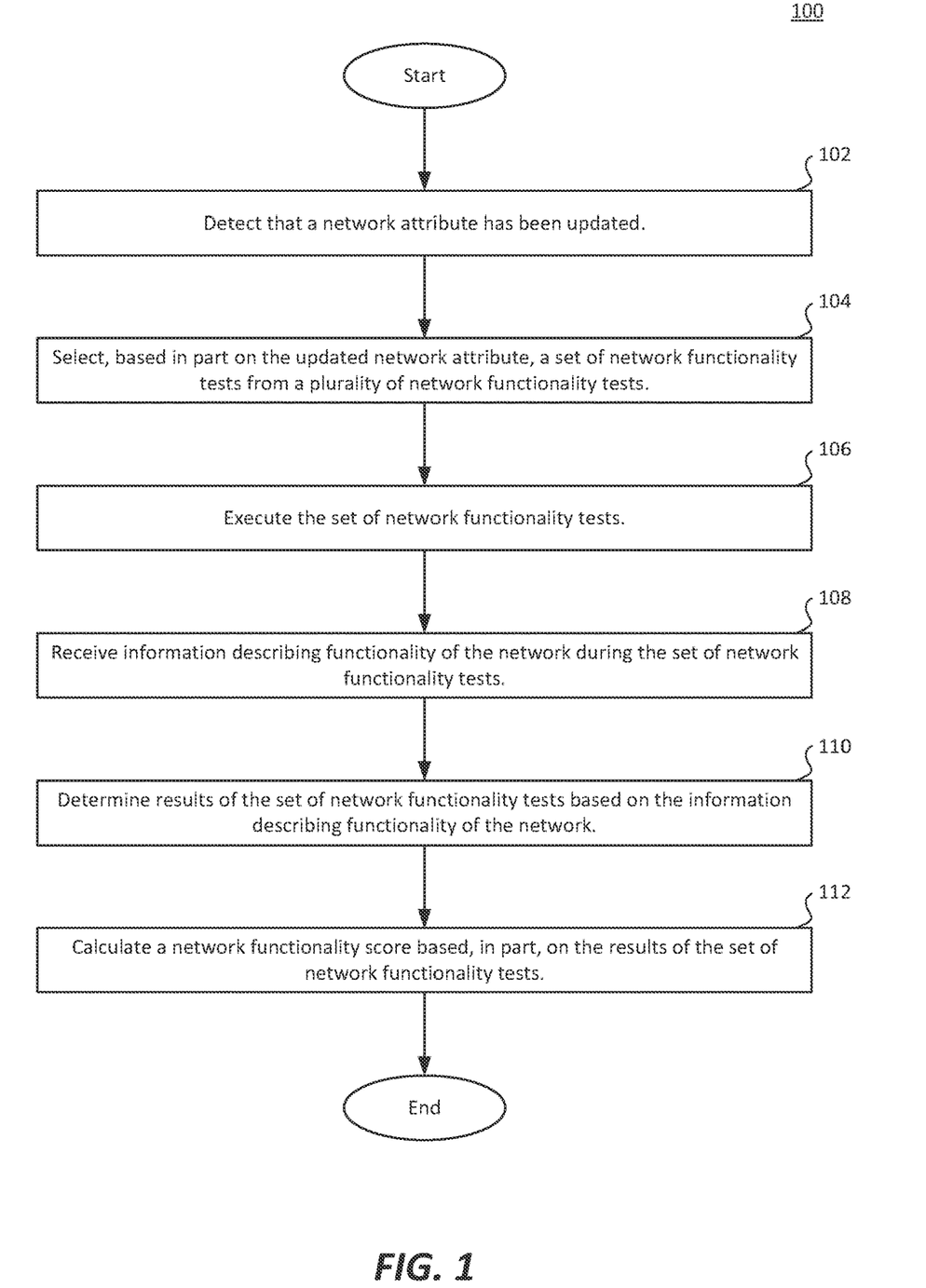
FIG. 1 is a flowchart illustrating an example method for scoring functionality of an example network.

FIG. 1 is a flowchart illustrating an example method for scoring functionality of an example network. Method 100 executes a set of network functionality tests upon detection that a network attribute has been updated. In some examples, method 100 is executed on a switch or router of the network. In some other examples, method 100 is executed on a server, which may be a dedicated network management device.

In block 102, the network device detects that a network attribute has been updated. The network attribute may be a configuration attribute of a network device (e.g. whether a feature is enabled in the configuration of the network device) or a status attribute of a network device (e.g. a current operating status of a component or feature of the device). In this disclosure, the term "status" refers to a measured operating condition of a component or function of a network device; the term "state" refers to the set of possible values a certain configuration or status may be. In some examples, the network device detects that the network attribute has been updated by receiving a notification from another network device that an updated configuration is being applied. In some other examples, the network device detects that the network attribute has been updated by a network administrator executing a command that informs the network device of the updated network attribute. In yet other examples, the network device detects that the network attribute has been updated by periodically requesting configuration information from network devices of the network and comparing the received responses to prior received responses from the network devices of the network. In other examples, the network device detects that the network attribute has been updated by periodically requesting status information from network devices of the network and comparing the responses to an expected status information. The network device may detect that the network attribute has been updated by any appropriate means.

In block 104, the network device selects a set of network functionality tests from a plurality of network functionality tests based, in part, on the updated network attribute detected in block 102. In some examples, the plurality of network functionality tests are stored such that each test of the plurality of network functionality tests includes information about triggers for running the test ("administrator test configuration parameters"). For example, a certain test may run in response to a detected configuration attribute change and a detected status attribute change, and be run against a configuration that has been proposed to be applied to a network device. In such an example, another certain test may run in response to a detected configuration attribute change after a delay and periodically as continuous background testing, and be run against a configuration applied to a network device.

Information about triggers for running tests may include whether the test should be run in response to a configuration attribute change, whether the test should be run in response to a status attribute change, whether the test should be run continuously in the background, whether and by how much the test should be delayed when run in response to each of the triggers, and whether the test should be run against a configuration that has been applied to a network device, against a configuration that has been proposed to be applied to a network device, or against network functionality (e.g. general network operability, specific network feature operability). In this disclosure, tests run against a configuration that has been applied to a network device refers to testing for intra-device defects, whereas tests run against network functionality refers to testing for inter-device defects. These terms may be used interchangeably in this disclosure where testing for both intra- and inter-device defects may be contemplated.

In block 106, the network device executes the set of network functionality tests. In some examples, the network device causes certain tests of the set of network functionality tests to be executed on other network devices of the network. In such examples, certain tests may be partially executed on each of a group of network devices of the network. For example, one certain test may include executing a "traceroute" command, which, among other things, causes each network device along a network path to generate a packet and send the packet to the originating network device.

Certain other tests of the set of network functionality tests may fully execute on the network device executing the set of network functionality tests. Yet other certain tests may fully execute on each of a group of network devices of the network and results from each execution may be aggregated at the network device executing the set of network functionality tests. Certain tests may include sending a command to management interfaces of a group of network devices of the network, receiving responses to the command from each of the group of network devices, and determining, based on the received responses, a result to the test. For example, the network device may send a network command requesting number of data packets received per minute per VLAN. Each device of the group of network devices may send a response including the requested data for the VLANs associated with each respective device.

In some examples, certain tests may be executed in a certain order. For example, the set of network functionality tests may include Test A, Test B, Test C, and Test D. In order to properly function, Test C may require execution of Test B prior to itself being executed. Similarly Test B may require Test A to be executed prior to itself being executed. However, Test D has no such requirement, and thus can be executed any time before, during, or after the A-B-C ordered test chain. In some examples, multiple tests may be executed substantially simultaneously (i.e. in parallel).

Tests of the set of network functionality tests may be designed in any format appropriate for determining the functionality of the network. However certain tests may be designed to conform to one of a handful of common network functionality test designs. Five such common network functionality test designs are described below.

Configuration comparison validation tests compare the configurations of interoperating network devices to detect intra- or inter-device defects due to incompatible configurations. For example, a certain test may determine whether the maximum transmission unit (MTU) configuration is the same size on neighboring VLANs. In certain configuration comparison validation tests, the configuration attributes are compared for equality (i.e. the network functionality being tested is considered operational if the configuration attributes are equal). In certain other configuration comparison validation tests the configuration attributes are compared for inequality (i.e. the network functionality being tested is considered operational if the configuration attributes are not equal). In some examples, configuration comparison validation tests compare attributes on a feature-by-feature basis. For example, a certain configuration comparison validation test may compare an access control list (ACL) to enabled features to determine whether the ACL blocks data traffic from an enabled feature. Configuration comparison validation tests may compare configuration attributes using any relationship appropriate for determining whether the network functionality being tested is operational.

Configuration anomaly detection tests validate that configurations across a network device (and across a group of network devices) are configured compatibly. In some examples, configurations of a set of similar ports across a group of network devices are analyzed to determine if one or more of the set of similar ports are configured similarly. In such examples, incongruous configuration of a minority of the set of similar ports may be determined to be configuration anomalies. For example, if a set of similar ports across a group of network devices are configured with 802.1x authentication enabled, but one of the set of similar ports is not configured with 802.1x authentication enabled, a certain network functionality test may detect this as an anomaly. In some examples, one set of similar ports are edge ports and another set of similar ports are inter-device ports. Configuration anomaly detection tests may also be applied across network devices. For example, if all edge devices are configured with a certain VLAN except for one, a certain configuration anomaly detection test may determine such a configuration to be anomalous.

Synthetic validation tests measure the operation of the network. In some examples, certain synthetic validation tests execute network tools (e.g. ping, traceroute, IP-SLA) to measure the network operation. Synthetic validation tests may validate features that modify packets and impact packet forwarding. Certain synthetic validation tests may check corresponding status attributes across peer network devices for compatibility. Certain other synthetic validation tests may send data traffic associated with simulated endpoints through the network corresponding to a certain feature or operation of the network. Some synthetic validation tests may determine the operability of a feature in a pass-fail manner (i.e. either the test passes or it fails). Some other synthetic validation tests may measure the operability of a feature in a gradated manner (i.e. throughput on a certain port is 94.6 megabits/second). All categories of network functionality tests may include such pass-fail and gradated tests.

Expected dynamic status tests validate that a dynamic attribute of the network has properly adjusted to a change in the network. For example, upon update of a configuration of a certain network device, a certain expected dynamic status test may validate that the spanning-tree neighbors of the certain network device see the certain network device as a neighbor and that they have the same spanning-tree root as the certain network device. Expected dynamic status tests may gather information for validating their respective dynamic attribute of the network by using a management protocol, such as simple network management protocol (SNMP) or representational state transfer (REST).

Expected traffic behavior tests validate the operation of a feature by monitoring the traffic detected that is relevant to the feature and comparing such traffic to an expected traffic pattern. Certain features (e.g. BGP, OSPF) would be expected to generate immediate and frequent data traffic, whereas certain other features (e.g. DHCP) may not immediately generate traffic (e.g. until the DHCP leases expire). In some examples, detected traffic for a feature is periodically compared to a traffic model of the feature for inconsistencies.

In block 108, the network device receives information describing functionality of the network during the set of network functionality tests. Information relating to the set of network functionality tests may be determined at many network devices across the network. In some examples, certain network functionality tests generate related information at multiple network devices across the network. The related information is then transmitted across the network to the originating device for further processing. Certain network functionality tests may generate related information at the originating device (i.e. the device executing the network functionality test) in a module or component that is not directly accessible by the relevant network functionality test. Such tests may receive the related information as a message from the module or component of the originating device.

In block 110, the network device determines results of the set of network functionality tests based on the information describing functionality of the network. In some examples, the result of a test is the information describing functionality of the network. For example, if a certain network functionality test determines whether a function is enabled on a certain network device, and the relevant information received in block 108 is a status attribute of the certain network device indicating that the function is enabled, no further processing is required. In some other examples, the result of a test is a determination based on comparing the relevant information received in block 108 to a threshold or model. For example, information relating to a gradated test may be compared against a threshold to generate a pass-fail result. In yet other examples, the result of a test is a determination based on comparing portions of the relevant information received in block 108 with other portions of the relevant information. As an example, configuration anomaly tests generally compare portions of the relevant information with other portions of the relevant information.

In block 112, the network device calculates a network functionality score based, in part, on the results of the set of network functionality tests. A plurality of network functionality tests may be designed for and registered with a test infrastructure including a common test framework. Each of the plurality of network functionality tests may be associated in the test infrastructure with configuration attributes, status attributes, and features that may affect the outcome of the respective network functionality test. In some examples, based on these associations, the test infrastructure automatically selects a set of network functionality tests to be run upon the occurrence of a certain trigger. For example, if the certain trigger is the enablement of BGP, all network functionality tests associated with BGP are selected to be included in the set of network functionality tests.

The test infrastructure may, in some examples, execute the set of network functionality tests as described in relation to block 106 and receive the results of the set of network functionality tests as described in relation to block 110. In such examples, based on each result of each network functionality test, the test infrastructure calculates a normalized score for the relevant test and a confidence. For example, the normalized score may be a floating point number in the range between −1.00 and +1.00 and the confidence may be a floating point number between 0.00 and 100.00. In some other examples, each network functionality test calculates its own network functionality score and confidence prior to completing execution.

In some examples, a score of a test is calculated based on the aggregated outcome of the results of the test. A test whose aggregated outcome is uniformly negative (i.e. a complete failure of the test) may be scored most negatively (e.g. −1.00 on a −1.00 to +1.00 scale). A test whose aggregated outcome is uniformly positive (i.e. a completely passing test) may be scored most positively (e.g. +1.00 on a −1.00 to +1.00 scale). A test whose aggregated outcome is mixed (i.e. some portions of the test are passing and some have failed) may be scored neutrally (e.g. 0.00 on a −1.00 to +1.00 scale). The scoring of a test may also account for missing and ambiguous information. As an example, a certain test may validate that a feature is enabled by querying a network device for a status attribute corresponding to the enablement of the feature. The status attribute, in such an example, may have three possible states: enabled, disabled, and starting. If the information returned to the certain test indicates that the status attribute is in the "starting" state, it is ambiguous as to whether the feature is properly enabled and was reset for reasons irrelevant to this test or whether the feature is broken and stuck attempting to start up. As another example, a certain test may determine whether a network device's neighbors see the network device in a complementary way (e.g. they reflect the same topology by seeing the network device as a neighbor). Four of five neighbor devices may transmit information that verify the network topology, but the fifth neighbor device may not respond to the test at all. It is unclear from the absence of the response from the fifth neighbor device whether the fifth neighbor device sees the network device in a complementary way. The connectivity issue may be completely unrelated to the network topology. The score of such a test may reflect the fact that the test was only able to confirm that four of the five neighbor devices passed the test, but that the fifth did not necessarily fail the test.

The confidence value also reflects information about missing and ambiguous information. The score and the confidence are interrelated so as to provide a more complete picture of the results of the test. To extend the example of the test determining whether the network device's neighbors see the network device in a complementary way, an example scoring mechanism is as follows. To calculate the score of the test, each validation of the proper topology from a neighbor device is worth +0.20, each inconsistency in topology with a neighbor device is worth −0.20, and any incomplete data is worth 0.00. Ideally, with all five neighbors responding positively, the score would be +1.00. Since four of the five neighbors responded positively and the fifth did not respond, the test score is +0.80. The confidence of the test is calculated differently. Each neighbor device that responds coherently to the test is worth +20 confidence. Ideally, with all five neighbors responding, the confidence is 100. Since four of five neighbors have responded, the confidence is 80. Thus, in this example, the network functionality score is +0.80 with an 80 confidence.

In some examples, each network functionality score for each test is presented to the network administrator. In some other examples, network functionality scores are additionally aggregated together to be presented to the network administrator based on various collections, such as by feature, by campus, by user, by protocol, or for the network as a whole. This disclosure contemplates any group, hierarchical or otherwise, of combinations of network functionality tests that would be appropriate or beneficial for presentation to the network administrator. In some examples, a network functionality score of a combination of tests is based on the network functionality scores and confidences of each test of the combination.

A network functionality test or combination of tests may be assigned a severity by a network administrator. The severity corresponds to the importance of the test or combination of tests. For example, a misconfiguration of VLANs may be relatively unimportant in a smaller network, but may be relatively more important in a larger network. Reducing the severity of a test in a combination of tests may reduce its impact on the overall network functionality score of the combination of tests. For example, a combination including three tests, each at a severity of 3, may equally weight the network functionality score of each test (taking confidence into account) when calculating the network functionality score of the combination. However, if one of the three tests is reduced to a severity of 2 (meaning that it is less important than the other two tests), the combination may weigh the severity-2 test at 24% and each of the severity-3 tests at 38% when calculating its network functionality score.

Once network functionality scores are obtained for all tests and combinations of tests, the test infrastructure may compare the test report (the aggregated network functionality scores) to a prior test report. Differences between the two reports may indicate improvement in network health or degradation in network health (or both). The test infrastructure may determine based on the network functionality scores, the confidences, and the severities, which features, defects, and issues most strongly impacted the differences between the reports.

Figure 2:
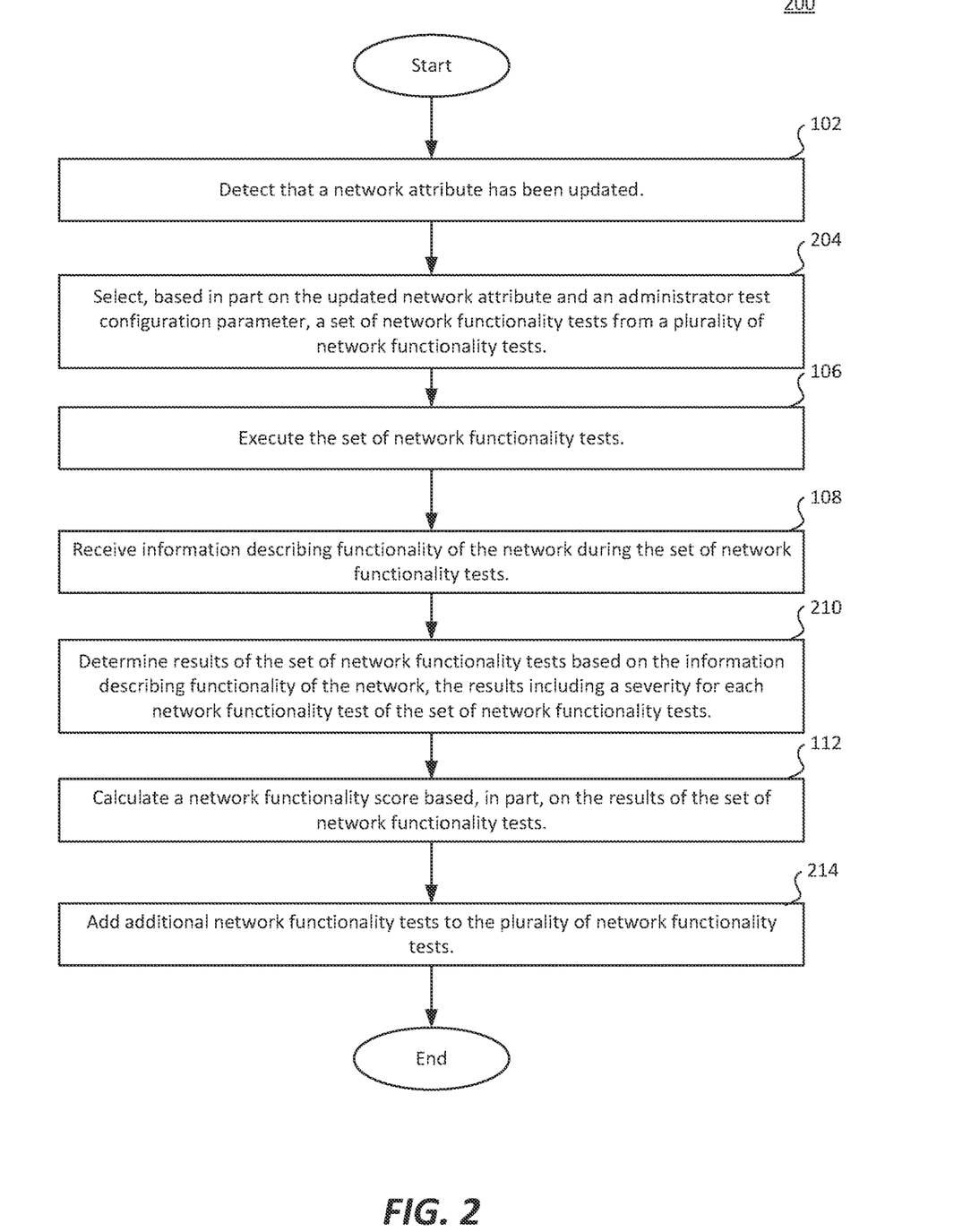
FIG. 2 is flowchart illustrating another example method for scoring functionality of an example network.

FIG. 2 is flowchart illustrating another example method for scoring functionality of an example network.

In block 102, a network device detects that a network attribute has been updated. As described in relation to FIG. 1, the network attribute may be a configuration attribute of a network device or a status attribute of a network device. Block 102 is further described in relation to FIG. 1.

In block 204, the network device selects, based in part on the updated network attribute and an administrator test configuration parameter, a set of network functionality tests from a plurality of network functionality tests. In some examples, a test infrastructure includes a common test framework. Each of the plurality of network functionality tests may be associated in the test infrastructure with configuration attributes, status attributes, and features that may affect the outcome of the respective network functionality test. In some examples, based on these associations, the test infrastructure automatically selects a set of network functionality tests to be run upon the occurrence of a certain trigger. In such examples, some of the plurality of network functionality tests are associated with the updated network attribute, and a set of network functionality tests from the tests associated with the updated network attribute based on their respective administrator test configuration parameters. In some examples, the administrator test configuration parameters include information about whether the test should be triggered to execute in response to configuration attribute changes, status attribute changes, continuous background (e.g. periodically), whether the test should be executed against a proposed new configuration of a network device or against a configuration that has been applied to a network device, and whether the test should be run at a delay after a certain type of trigger.

As an example, if a new proposed configuration impacting a certain configuration attribute is detected for a network device, the test infrastructure would select a set of network functionality tests from the plurality of network functionality tests that are associated with the certain configuration attribute and are triggered to be executed against a proposed configuration in response to a configuration change. If the same proposed configuration is then applied to the network device, the test infrastructure would select another set of network functionality tests from the plurality of network functionality tests that are associated with the certain configuration attribute and are triggered to be executed against an applied configuration in response to a configuration change. Some certain network functionality tests may be included in the set of network functionality tests run against the proposed configuration and the set of network functionality tests run against the applied configuration. Certain network functionality tests may be run after a specified delay in response to the configuration change, and certain network functionality tests may execute in a certain order relative to other certain network functionality tests.

In block 106, the network device executes the set of network functionality tests. Block 106 is further described in relation to FIG. 1.

In block 108, the network device receives information describing functionality of the network during the set of network functionality tests. Block 108 is further described in relation to FIG. 1.

In block 210, the network device determines results of the set of network functionality tests based on the information describing functionality of the network, the results including a severity for each network functionality test of the set of network functionality tests. A severity is associated with each network functionality test of the set of network functionality tests. In some examples, each severity is determined by a network administrator. In some other examples, each severity is automatically determined prior to execution of the respective network functionality test. Each severity may be included in the determined results of the respective network functionality test. Additional description of the functioning of block 210 can be found in the description of similar block 110 in relation to FIG. 1.

In block 112, the network device calculates a network functionality score based, in part, on the results of the set of network functionality tests. Block 112 is further described in relation to FIG. 1.

In block 214, the network device adds additional network functionality tests to the plurality of network functionality tests. The test infrastructure may accept new network functionality tests. In some examples, the network device may receive additional network functionality tests from a network functionality test repository located elsewhere on the network, outside of the network, on a portable memory device, or in any location appropriate for transmitting network functionality tests to the network device. In some other examples, the network device may allow a network administrator to design a new network functionality test and add it to the plurality of network functionality tests.

Figure 3:
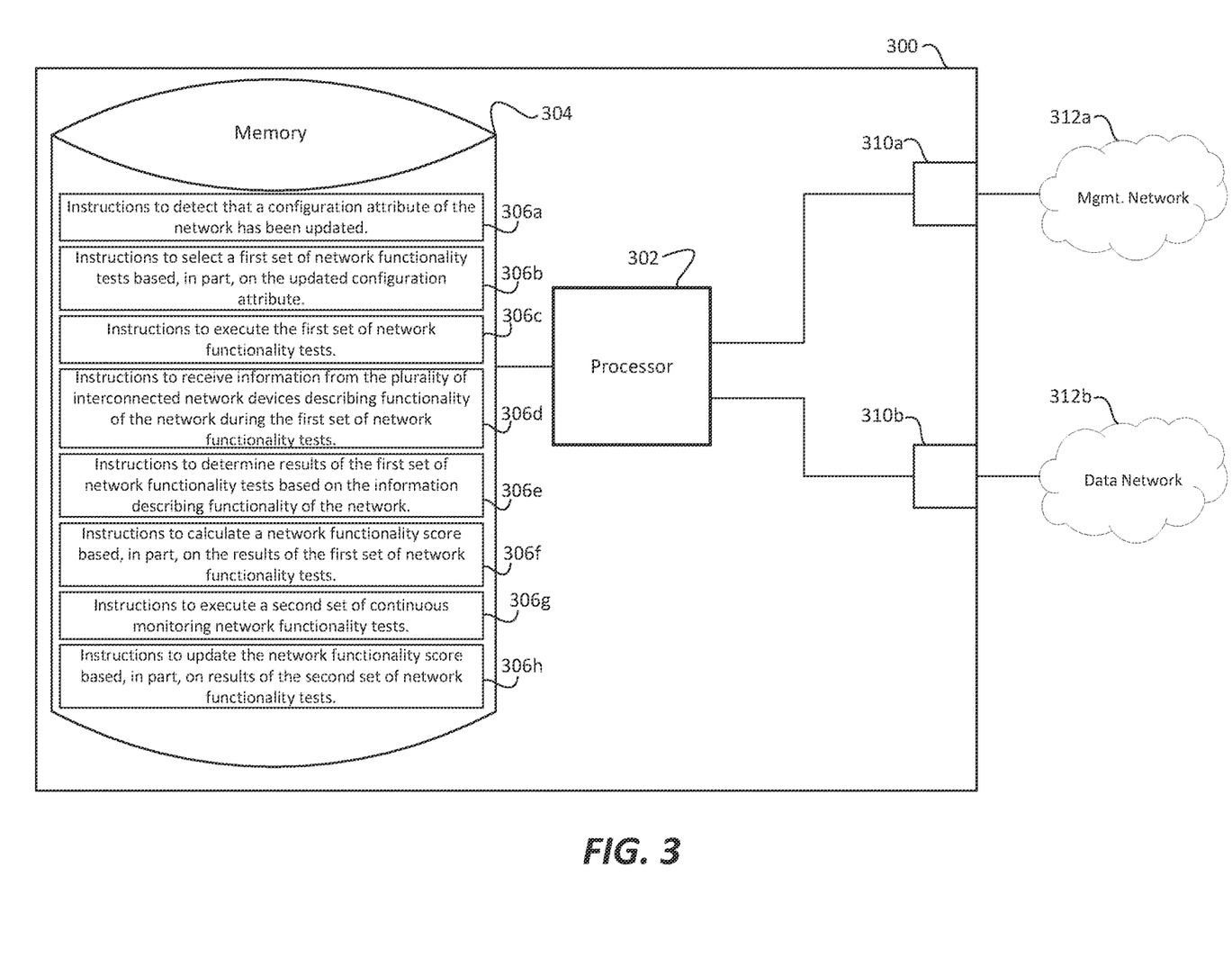
FIG. 3 illustrates an example network device to score functionality of an example network.

FIG. 3 illustrates an example network device to score functionality of an example network. Network device 300 includes a processor 302, memory 304, and interfaces 310a and 310b. Memory 304 is coupled to processor 302 and includes instructions 306a-h that, when executed by processor 302, cause processor 302 to perform certain actions. Processor 302 is further coupled to management interface 310a and data interface 310b. In some examples, management interface 310a and data interface 310b are a single interface. Management interface 310a is coupled to a management network 312a. Data interface 310b is coupled to a data network 312b.

In some examples, network device 300 is a server. In some other examples, network device 300 is a switch. In yet other examples, network device 300 is a hardware device purpose-built for testing networks. Network device 300 may execute all instructions 306 or portions of instructions 306. Network device 300 may test the network independently of other devices or in conjunction with other network devices 300.

Memory 304 includes instructions 306a-306h. When executed on processor 302, instructions 306a-306h may cause processor 302 to perform certain actions, including transmitting and receiving data across interfaces 310a and 310b.

Instructions 306a include instructions to detect that a configuration attribute of the network has been updated. In some examples, information indicating that the configuration attribute has been updated is received on interface 310a or interface 310b. In some other examples, instructions 306a cause processor 302 to monitor the configuration attribute on network device 300. The configuration attribute may be an attribute of a proposed configuration to be applied to a device of the network. Alternatively, the configuration attribute may be an attribute of a configuration that has already been applied to a device of the network. Alternatively, the configuration attribute may be a status attribute of a device of the network. In some examples, a configuration attribute is considered to be updated when the configuration attribute changes from a first value to a second value.

Instructions 306b include instructions to select a first set of network functionality tests based, in part, on the updated configuration attribute. In some examples, a test infrastructure includes a plurality of network functionality tests. Each network functionality test may be tagged or otherwise associated with one or more configuration attributes. Some of the plurality of network functionality tests may be associated with the updated configuration attribute. The first set of network functionality tests are selected from the tests associated with the updated configuration attribute.

Instructions 306c include instructions to execute the first set of network functionality tests. Certain network functionality tests may fully execute on network device 300. Certain other network functionality tests may transmit and receive data across interfaces 310a and 310b.

Instructions 306d include instructions to receive information from the plurality of interconnected network devices describing functionality of the network during the first set of network functionality tests. Certain network functionality tests may request information from other devices on the network. Certain other network functionality tests may cause other devices on the network to execute instructions and return information derived from those instructions to network device 300.

Instructions 306e include instructions to determine results of the first set of network functionality tests based on the information describing functionality of the network. In some examples, the information received may be aggregated to determine the results. In some other examples, the information received may be compared to thresholds or models to determine the results.

Instructions 306f include instructions to calculate a network functionality score based, in part, on the results of the first set of network functionality tests. In some examples, a hierarchical set of network functionality scores are calculated whose hierarchical structure is based on a hierarchical structure of a configuration of a network device.

Instructions 306g include instructions to execute a second set of continuous monitoring network functionality tests. The second set of continuous monitoring network functionality tests may be triggered periodically. In some examples, the second set of continuous monitoring network functionality tests are triggered by a configuration or status attribute of the network crossing a threshold. For example, network functionality tests may execute when overall network traffic is below 25% of capacity.

Instructions 306h include instructions to update the network functionality score based, in part, on results of the second set of network functionality tests. In some examples, updating the network functionality score includes retrieving the current network functionality score and modifying the score based on results of the second set of continuous monitoring network functionality. In some other examples, updating the network functionality score includes calculating a new network functionality score and replacing the current network functionality score with the new network functionality score.

Figure 4:
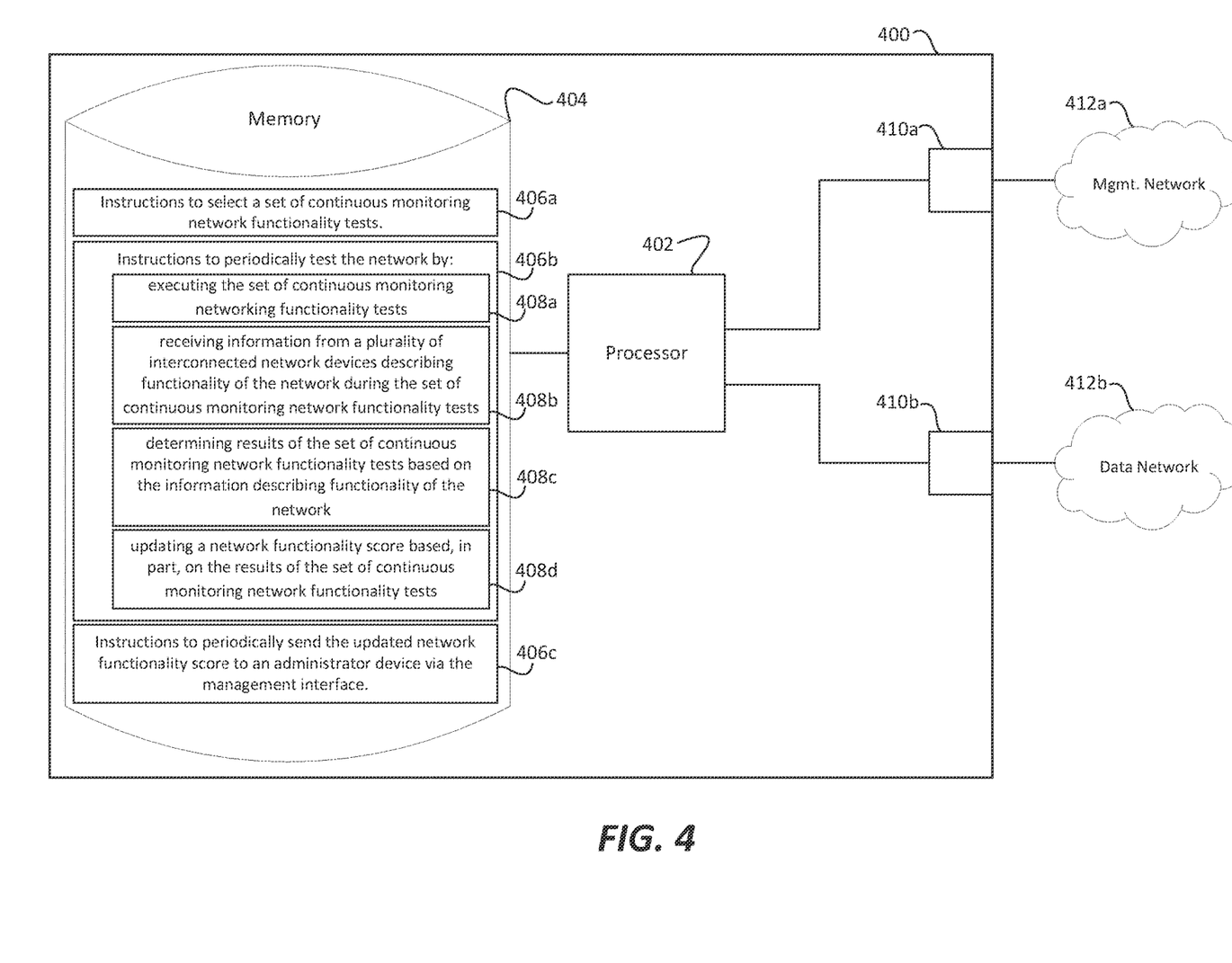
FIG. 4 illustrates another example network device to score functionality of an example network.

FIG. 4 illustrates another example network device to score functionality of an example network. Network device 400 includes a processor 402, memory 404, and interfaces 410a and 410b. Memory 404 is coupled to processor 402 and includes instructions 406a-c that, when executed by processor 402, cause processor 402 to perform certain actions. Instructions 406b include sub-instructions 408a-d to periodically test the network. Processor 402 is further coupled to management interface 410a and data interface 410b. In some examples, management interface 410a and data interface 410b are a single interface. Management interface 410a is coupled to a management network 412a. Data interface 410b is coupled to a data network 412b.

In some examples, network device 400 is a server. In some other examples, network device 400 is a switch. In yet other examples, network device 400 is a hardware device purpose-built for testing networks. Network device 400 may execute all instructions 406 or portions of instructions 406. Network device 400 may test the network independently of other devices or in conjunction with other network devices 400.

Memory 404 includes instructions 406a-406c. Instructions 406b includes sub-instructions 408a-d. When executed on processor 402, instructions 406a-406c may cause processor 402 to perform certain actions, including transmitting and receiving data across interfaces 410a and 410b.

Instructions 406a include instructions to select a set of continuous monitoring network functionality tests. In some examples, the set of continuous monitoring network functionality tests are "sanity" tests that verify the continued basic functioning of the network. In some other examples, the states of various configuration and status attributes are used to select the set of continuous monitoring network functionality tests and the set of tests verify that enabled features of the network are properly functioning.

Instructions 406b include instructions to periodically test the network. In some examples, the instructions to periodically test the network are triggered by a certain time having elapsed. In some other examples, the instructions to periodically test the network are triggered by a network event. Instructions 406b include sub-instructions 408a to execute the set of continuous monitoring networking functionality tests. Instructions 406b further include sub-instructions 408b to receive information from a plurality of interconnected network devices describing functionality of the network during the set of continuous monitoring network functionality tests. Instructions 406b further include sub-instructions 408c to determine results of the set of continuous monitoring network functionality tests based on the information describing functionality of the network. Instructions 406b further include sub-instructions 408d to update a network functionality score based, in part, on the results of the set of continuous monitoring network functionality tests.

Instructions 406c include instructions to periodically send the updated network functionality score to an administrator device via the management interface. In some examples, the administrator device is a network service device that provides a web or application portal for a network administrator to access the updated network functionality score. In some other examples the administrator device is a device that the network administrator directly controls to access the updated network functionality score. Periodically sending the updated network functionality score may include sending an alert to the network administrator when the updated network score crosses a certain threshold.

Although the present disclosure has been described in detail, it should be understood that various changes, substitutions and alterations can be made without departing from the spirit and scope of the disclosure. Any use of the words "may" or "can" in respect to features of the disclosure indicates that certain examples include the feature and certain other examples do not include the feature, as is appropriate given the context. Any use of the words "or" and "and" in respect to features of the disclosure indicates that examples can contain any combination of the listed features, as is appropriate given the context.

Phrases and parentheticals beginning with "i.e." and "e.g." are used to provide examples merely for the purpose of clarity. It is not intended that the disclosure be limited by the examples provided in these phrases and parentheticals. The scope and understanding of this disclosure may include certain examples that are not disclosed in such phrases and parentheticals.

The invention claimed is:

1. A method for monitoring a network, the method comprising:
 detecting, at a network device of the network, that a network attribute has been updated;
 selecting, by the network device and based in part on the updated network attribute, a set of network functionality tests from a plurality of network functionality tests, wherein the plurality of network functionality tests include tests involving the network device and a neighbor device;
 causing, by the network device, the neighbor device to execute the set of network functionality tests and to receive information describing functionality of the network during execution of the set of network functionality tests;
 receiving, at the network device, the information describing functionality of the network from the neighbor device;
 determining, by the network device, results of the set of network functionality tests based on the information describing functionality of the network; and
 calculating, by the network device, a network functionality score based, in part, on the results of the set of network functionality tests.

2. The method of claim 1, further comprising executing, at the network device, the set of network functionality tests, wherein the results of the set of network functionality tests is based on the information describing functionality of the network from the network device and the information describing functionality of the network from the neighbor device.

3. The method of claim 1, wherein the updated network attribute indicates occurrence of at least one of: a change to a configuration of the network device, a change in a status of the network device, a change to a configuration of the neighbor device, a change in a status of the neighbor device, and a change to a topology of the network.

4. The method of claim 1, wherein the set of network functionality tests includes a network functionality test that detects a defect caused by an incompatibility between the configuration of the network device and the configuration of the neighbor device.

5. The method of claim 1, wherein at least a portion of the set of network functionality tests is executed against a proposed configuration to be applied to the neighbor device.

6. The method of claim 1, wherein the results of each of the set of network functionality tests includes a severity and wherein the network functionality score of each of the network functionality tests includes a confidence.

7. The method of claim 1, wherein each network functionality test of the plurality of network functionality tests is tagged to be run in response to at least one of: a configuration change, a status change, and continuous background testing.

8. A networking system, comprising:
 a plurality of interconnected network devices, including:
  a first network device, comprising:
   a network interconnection interface;
   a management interface;
   a processor; and
   a non-transitory computer readable medium having stored therein instructions that, when executed on the processor, cause the processor to:
    detect that a configuration attribute of the network has been updated;
    select a first set of network functionality tests based, in part, on the updated configuration attribute;
    cause an execution of the first set of network functionality tests on the plurality of interconnected network devices describing functionality of the network during the first set of network functionality tests;
    receive, at the network interconnection interface, information from the plurality of interconnected network devices describing functionality of the network during the first set of network functionality tests;
    determine results of the first set of network functionality tests based on the information describing functionality of the network;
    calculate a network functionality score based, in part, on the results of the first set of network functionality tests;
    cause an execution of the second set of continuous monitoring network functionality tests on the plurality of interconnected network devices; and
    update the network functionality score based, in part, on results of the second set of network functionality tests; and
 a network administrator device coupled to the management interface of the first network device to receive the network functionality score.

9. The networking system of claim 8, wherein the instructions further cause the processor to execute the first set of network functionality tests, and wherein the results of the first set of network functionality tests is based on the information describing functionality of the network from the network device and the information describing functionality of the network from the interconnected network devices.

10. The networking system of claim 8, wherein the updated network attribute indicates occurrence of at least one of: a change to a configuration of the network device, a change in a status of the network device, a change to a configuration of a neighbor of the network device, a change in a status of the neighbor of the network device, and a change to a physical topology of the network.

11. The networking system of claim 8, wherein each network functionality test of the plurality of network functionality tests is tagged to be run in response to at least one of: a configuration change, a status change, and continuous background testing.

12. The networking system of claim 11, wherein a network functionality test tagged to be run in response to a configuration change validates a proposed configuration not yet applied to the first device.

13. The networking system of claim 11, wherein a networking functionality test tagged to be run in response to at least one of a status change and continuous background validates a configuration that has been applied to the first device.

14. The networking system of claim 8, wherein a network functionality test of the set of network functionality tests transmits a first packet on the networking system and determines a result of the network functionality test based in part on a second packet received in response to the first packet.

15. The networking system of claim 8, wherein a network functionality test of the set of network functionality tests transmits a first management command to the management interface of the first device and determines a result of the network functionality test based in part on a response to the first management command.

16. A network device to couple to a network, the network device comprising:
a network interconnection interface;
a management interface;
a processor; and
a non-transitory computer readable medium having stored therein instructions that, when executed on the processor, cause the processor to:
select a set of continuous monitoring network functionality tests from a plurality of network functionality tests;
periodically test the network, wherein each iteration of testing the network comprises:
orchestrating an execution of the set of continuous monitoring network functionality tests at the plurality of interconnected network devices;
receiving, at the network interconnection interface, information from a plurality of interconnected network devices describing functionality of the network during the set of continuous monitoring network functionality tests;
determining results of the set of continuous monitoring network functionality tests based on the information describing functionality of the network; and
updating a network functionality score based, in part, on the results of the set of continuous monitoring network functionality tests; and
periodically send the updated network functionality score to an administrator device via the management interface.

17. The network device of claim 16, wherein determining the results of the set of continuous monitoring network functionality tests comprises at least one of:
comparing a configuration of a first interconnected network device of the plurality of interconnected network devices to a configuration of second interconnected network device of the plurality of interconnected network devices;
detecting an inconsistency in the configuration of the first interconnected network device;
transmitting a first packet to the first interconnected network device and receiving a second packet in response;
comparing a status attribute of the first interconnected network device to an expected status attribute given the configuration of the first interconnected network device; and
monitoring a plurality of packets received at the first interconnected network device.

18. The network device of claim 16, wherein each network functionality test of the plurality of network functionality tests is tagged to be run in response to at least one of: a configuration change, a status change, and continuous background.

19. The network device of claim 16, wherein the instructions further cause the processor to add additional network functionality tests to the plurality of network functionality tests.

20. The network device of claim 16, wherein the instructions further cause the processor to:
detect that a configuration attribute of the network has been updated;
select a second set of network functionality tests based, in part, on the updated configuration attribute;
orchestrate an execution of the second set of network functionality tests at the interconnected network devices;
receive, at the network interconnection interface, information from a plurality of interconnected network devices describing functionality of the network during the second set of network functionality tests;
determine results of the second set of network functionality tests based on the information describing functionality of the network; and
calculate the network functionality score based, in part, on the results of the second set of network functionality tests.

21. The network device of claim 20, wherein the network functionality score is calculated prior to said periodically testing the network.

* * * * *